Patented Nov. 14, 1922.

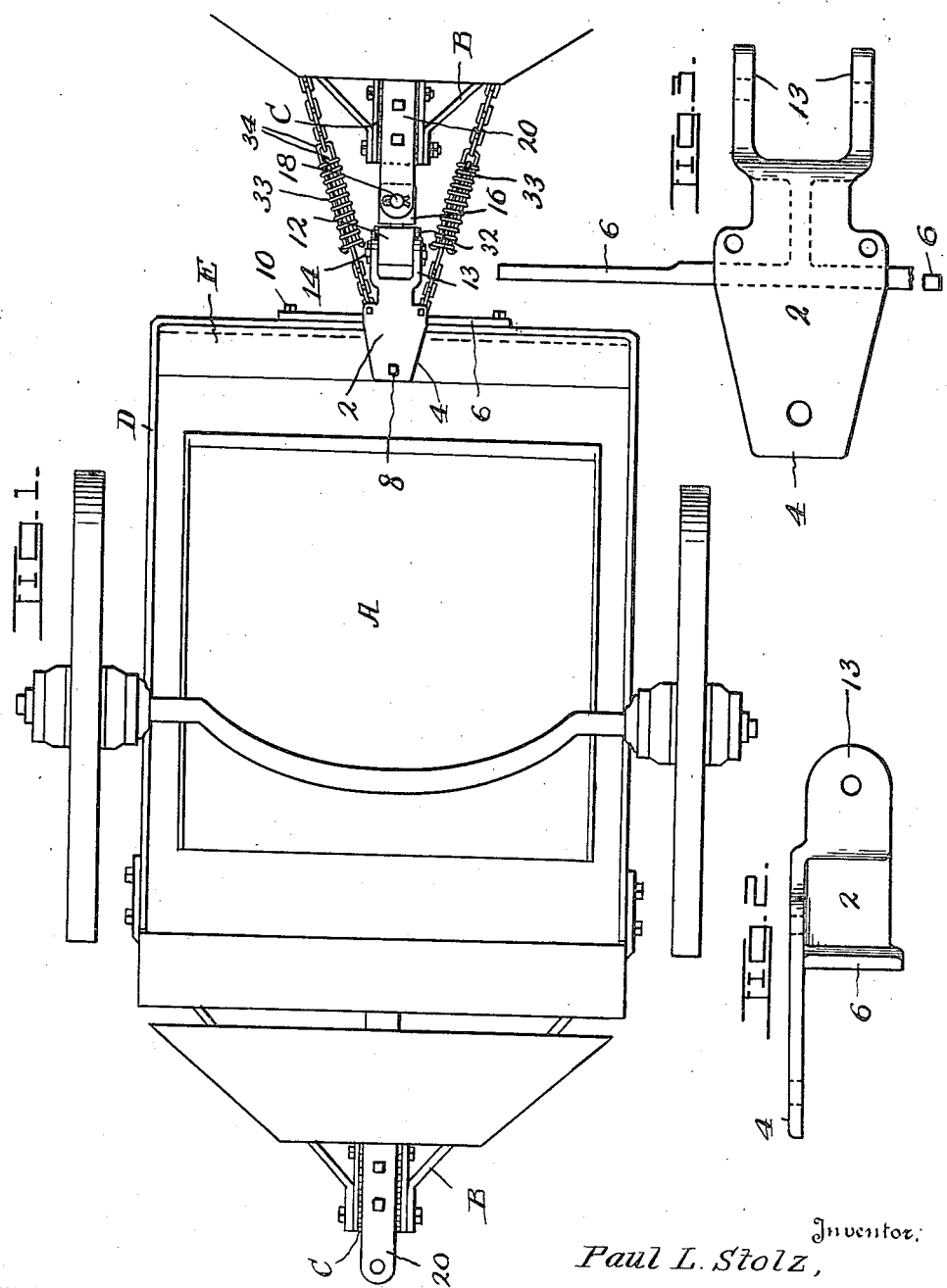

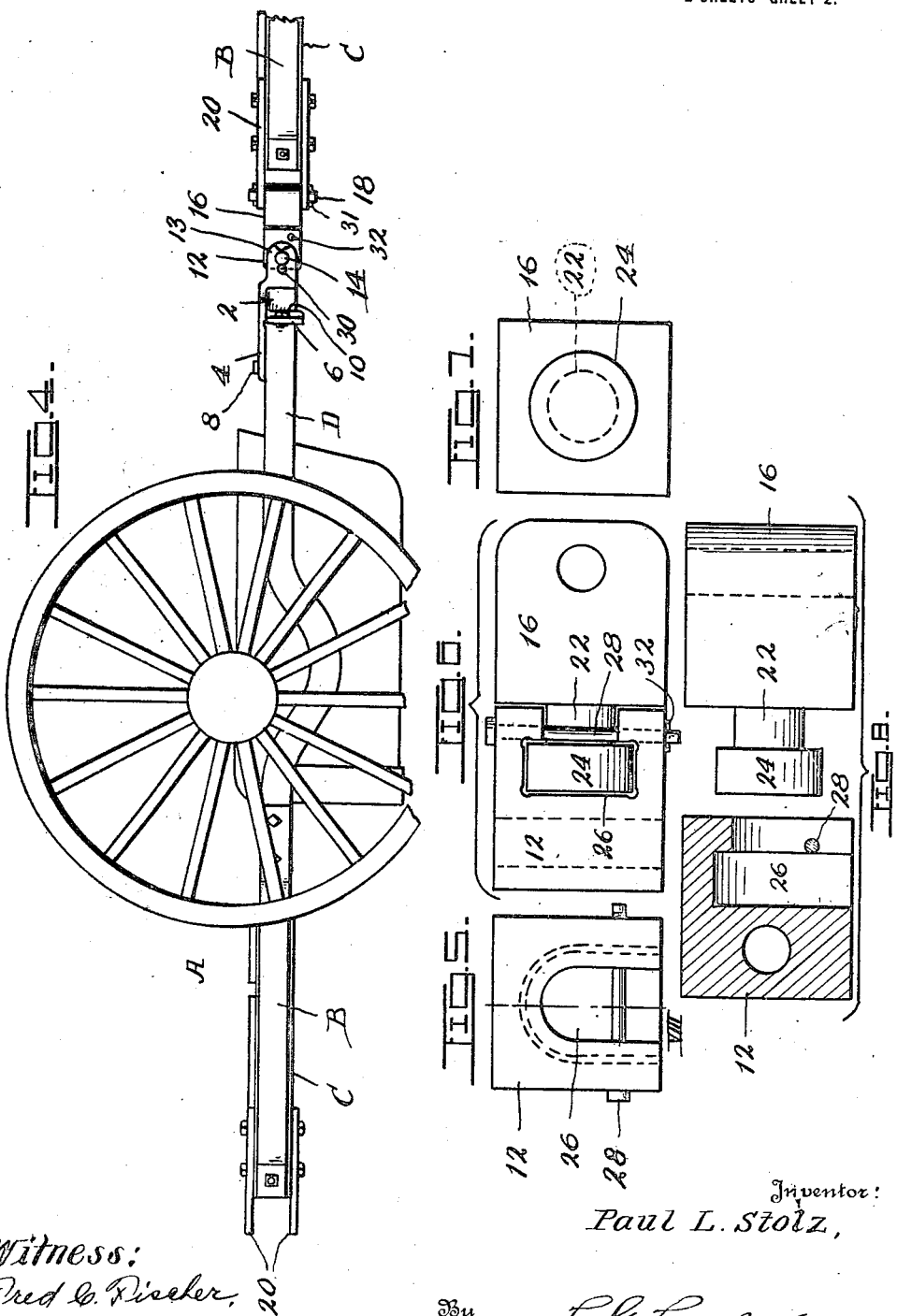

1,435,753

UNITED STATES PATENT OFFICE.

PAUL L. STOLZ, OF KANSAS CITY, MISSOURI, ASSIGNOR TO SMITH & SONS MANUFACTURING COMPANY, OF KANSAS CITY, MISSOURI, A CORPORATION OF MISSOURI.

COUPLING FOR VEHICLES.

Application filed June 2, 1921. Serial No. 474,433.

*To all whom it may concern:*

Be it known that I, PAUL L. STOLZ, a citizen of the United States, residing at Kansas City, in the county of Jackson and State of Missouri, have invented certain new and useful Improvements in Couplings for Vehicles, of which the following is a specification.

My invention relates to improvements in couplings for connecting road grading and other vehicles together in tandem style, and my objects are to provide a new and useful device of this character which is substantial in construction and in which the several elements are so formed and connected together as to provide for universal movement, so that the coupled vehicles will have ample independent movement in turning around and in passing over obstructions in the road and at the same time avoid undue wear of the elements constituting the coupler.

In order that the invention may be fully understood, reference will now be had to the accompanying drawings, in which:

Fig. 1 is a plan view of one two-wheeled scraper and part of another coupled together.

Fig. 2 is a side elevation of a clevis, enlarged, constituting a part of the invention.

Fig. 3 is an enlarged plan view of the clevis member of the coupling.

Fig. 4 is a side elevation of the parts disclosed by Fig. 1, with the springs and chains removed.

Fig. 5 is an end elevation of one of the coupling members.

Fig. 6 is an inverted plan view of two of the coupling members connected together.

Fig. 7 is an end elevation of one of the coupling members.

Fig. 8 shows the two coupling members disclosed by Fig. 6, disconnected and one in vertical section on line VIII of Fig. 5, the other being in side elevation.

Referring now in detail to the various parts, A designates a two wheeled scraper of ordinary or preferred construction having draft bars B connected at their forward ends to a short tongue C and at their rear ends to the forward ends of a U-shaped draft bar D, reinforced at its rear portion by a transverse angle iron E.

Referring now more particularly to the coupler constituting the important feature of the invention, 2 designates a clevis having an internal flange 4 and oppositely-disposed arms 6. The flange 4 is secured to the top of the transverse angle iron E by a bolt 8, and the arms 6 are secured to rear sides of the draft bars D and E by bolts 10.

12 designates a coupling member operably connected at its forward end between the jaws 13 of the clevis 2 by a horizontally disposed pivot 14, so that the rear end of said member 12 may swing in a vertical plane.

16 designates a coupling member mounted at its rear end upon a vertically-disposed pivot 18, so that its forward end may swing in a horizontal plane. The pivot 18 is mounted in the forward ends of a pair of metallic straps 20, firmly secured to the tongue C of the rear vehicle.

The coupling members 12 and 16 are connected to rotate independently of each other in a horizontal plane by means of a journal 22, extending forwardly from the coupling member 16 and provided with a circular flange 24 to hold it in a recess 26 in the rear portion of the coupling member 12. The recess 26 is open at its under and rear sides to freely admit the journal 22 and its flange 24 which are then secured in said slot by a pin 28 extending transversely through the member 12 at a point just beneath the journal 22. The top and two sides of the slot 26 are closed to exclude dirt, gravel and other foreign matter likely to cause undue wear of the journal 22.

The pivots 14 and 18 and the pin 28 are secured from accidental displacement by suitable means such as cotters 30, 31 and 32, respectively.

Lost motion between the members of the coupler is taken up by coil springs 33 connected to U-shaped rods 34, two of which are connected to the rear vehicle by cables 36, while the other two are connected to the forward vehicle by cables 38, the forward ends of which are secured to the clevis 2 by suitable means such as bolts 40.

By forming and connecting the several members of the coupler together as above described it is apparent that universal movement between the two vehicles is provided for, so that they may turn corners and pass over obstacles in the road without exerting undue wear on the conveyer, as the horizontal pivot 14 provides for movement in a vertical plane, the vertical pivot 18 for movement in a horizontal plane, and the journal 22 for independent rotary movement. When desired the two vehicles may be readily uncoupled by disconnecting the chains 38 from the bolts 40 and removing either of the pivots 14, 18.

While I have shown the preferred form of the coupler, I reserve the right to make such changes in the construction, combination and arrangement of parts as properly fall within the spirit and scope of the appended claims.

Having thus described my invention, what I claim and desire to secure by Letters Patent, is:

1. A coupler of the character described consisting of a member adapted to be rigidly secured to a vehicle, another member adapted to be operably connected to another vehicle to be coupled to the first vehicle, an intervening member operably connected to one of the aforementioned members and rotatably connected to the other member to allow limited independent movement of the vehicles, cables connected to opposite sides of the first-mentioned coupler member and diverging rearwardly, cables connected to the rear vehicle and converging forwardly, and springs connected to the cables, substantially as shown and described.

2. A coupling consisting of a clevis having an integral forwardly extending flange and laterally-extending arms adapted to be secured to a vehicle, a coupling member pivotally connected at its forward end to said clevis and having a recess open at its rear and under sides, another coupling member adapted to be pivotally connected at its rear end to a second vehicle, a journal projecting forwardly from the last-mentioned coupling member and provided with a circular flange, said journal and flange being arranged to snugly but rotatively fit within the recess of the first-mentioned coupling member, and a removable pin extending transversely through the first coupling member to retain the journal and its flange in the recess, substantially as shown and described.

In testimony whereof I affix my signature, in the presence of two witnesses.

PAUL L. STOLZ.

Witnesses:
F. C. FISCHER,
L. J. FISCHER.